US006095036A

United States Patent [19]
Tocchet

[11] Patent Number: 6,095,036

[45] Date of Patent: Aug. 1, 2000

[54] HERMETIC SEALING ASSEMBLY FOR REFRIGERATORS IN MACHINES FOR VENDING PREPACKAGED FOODSTUFFS, SUCH AS TOASTS, SMALL PIZZAS OR THE LIKE

[76] Inventor: Ivan Tocchet, Via Pian Salesei, 18 31029, Vittorio Veneto, Italy

[21] Appl. No.: 09/214,342

[22] PCT Filed: Apr. 29, 1998

[86] PCT No.: PCT/EP98/02536

§ 371 Date: Jan. 4, 1999

§ 102(e) Date: Jan. 4, 1999

[87] PCT Pub. No.: WO98/52166

PCT Pub. Date: Nov. 19, 1998

[30] Foreign Application Priority Data

May 12, 1997 [IT] Italy ................................ PD97A0103

[51] Int. Cl.[7] ............................ A47J 27/00; A47J 37/00; G07F 9/10; G07F 11/00

[52] U.S. Cl. ................................ 99/357; 99/470; 99/517; 62/250; 62/251; 62/252

[58] Field of Search ............................. 99/325–330, 357, 99/451, 470, 483, 485, 517, DIG. 14; 62/237, 246, 249–254; 221/150, 150 HC; 219/678, 698, 702, 756; 426/523

[56] References Cited

U.S. PATENT DOCUMENTS

| | | | |
|---|---|---|---|
| 1,755,699 | 4/1930 | Loehr | 99/355 X |
| 1,973,195 | 9/1934 | Ankcorn | 53/155 X |
| 3,340,789 | 9/1967 | Simjian | 99/352 X |
| 3,984,030 | 10/1976 | Morini | 99/357 |
| 4,008,657 | 2/1977 | Yamamura et al. | 99/483 X |
| 4,179,985 | 12/1979 | Baker et al. | 99/339 |
| 4,349,774 | 9/1982 | Tokuo . | |
| 5,113,754 | 5/1992 | Robinson et al. | 99/326 X |
| 5,168,795 | 12/1992 | Okada | 99/326 X |
| 5,172,328 | 12/1992 | Cahlander et al. | 99/325 |
| 5,309,824 | 5/1994 | Dromgoole et al. | 99/357 X |
| 5,365,835 | 11/1994 | Naramura | 99/357 |
| 5,400,699 | 3/1995 | Cailbault | 99/357 |
| 5,555,793 | 9/1996 | Tocchet et al. . | |

FOREIGN PATENT DOCUMENTS

| | | |
|---|---|---|
| 3738708 | 5/1989 | Germany . |
| 9428700 | 12/1994 | WIPO . |

*Primary Examiner*—Timothy Simone
*Attorney, Agent, or Firm*—Guido Modiano; Albert Josif; Daniel O'Byrne

[57] ABSTRACT

A hermetic sealing assembly for refrigerators in machines for vending prepackaged foodstuffs, such as sandwiches, toasts, small pizzas or the like comprising a sliding plate which is moved in an axial and planar direction by actuation means and is adapted to act as a sealing element for a refrigeration chamber during food storage and as a removable support, during vending, for a stack of metallic containers which contain the prepackaged food to be dispensed. The lowermost container of the stack rests on the plate and can instead fall freely by gravity into a collection seat for vending when the plate is removed by axial movement. Means for temporarily supporting the containers stacked on top of the lowermost container are also provided in the assembly and are associated and synchronized with the plate.

8 Claims, 3 Drawing Sheets

HERMETIC SEALING ASSEMBLY FOR REFRIGERATORS IN MACHINES FOR VENDING PREPACKAGED FOODSTUFFS, SUCH AS TOASTS, SMALL PIZZAS OR THE LIKE

BACKGROUND OF THE INVENTION

The present invention relates to a hermetic sealing assembly for refrigerators in machines for vending prepackaged foodstuffs such as toasts, small pizzas and the like.

Food vending machines, particularly for warm food such as toasts, sandwiches, small pizzas, buns or the like, are currently widely used.

In these vending machines, the food is preloaded in a deep-frozen state and must be kept in that state.

Accordingly, said vending machines, in addition to having a cooking section, also have one or more refrigeration chambers for storing the food.

During normal use, the food is removed automatically from the refrigeration chambers where it is stored and is transferred for cooking and then distributed to the user.

In particular, the vending machines described herein have a rather significant drawback consisting in the formation of moisture in the refrigeration chamber (or chambers) due to the heat exchange that occurs between the inside of the chamber and the environment outside said chamber.

Moisture formation is particularly damaging, since said moisture can be absorbed by the prepackaged products, severely affecting their organoleptic and culinary characteristics.

SUMMARY OF THE INVENTION

The aim of the present invention is to provide a hermetic sealing assembly for refrigerators in machines for vending prepackaged foodstuffs such as toasts, small pizzas or the like, which allows the prepackaged food to pass from the refrigeration chambers to the vending section and/or to the cooking section without significant heat exchanges, consequently eliminating the unwanted condensation effect.

Within the scope of this aim, an object of the present invention is to provide a hermetic sealing assembly suitable to also provide vending starting from the refrigeration assembly quickly, effectively and selectively.

Another object of the present invention is to provide a sealing assembly which is particularly tough and can optionally be manufactured also in small sizes.

Another object of the present invention is to provide a sealing assembly which does not require particular maintenance and can optionally also be applied to food vending machines which are currently in production.

Another object of the present invention is to provide a sealing assembly which can optionally be associated with similar assemblies in order to meet the most disparate application requirements.

Another object of the present invention is to provide a hermetic sealing assembly which can be manufactured with conventional technologies and at low costs with respect to conventional sealing assemblies.

This aim, these objects and others which will become apparent hereinafter are achieved by a hermetic sealing assembly for refrigerators in machines for vending prepackaged foodstuffs, such as sandwiches, toasts, small pizzas or the like, characterized in that it comprises a sliding plate which is moved in an axial and planar direction by actuation means and is suitable to act as a sealing element for a refrigeration chamber during food storage and as a removable support, during vending, for a stack of metallic containers which contain the prepackaged food to be dispensed, the lowermost container of said stack resting on said plate and being instead able to fall freely by gravity into a collection seat for vending when said plate is removed by axial movement; supporting means for temporarily supporting the containers stacked above the lowermost container being provided and being associated and synchronized with said axial movement.

BRIEF DESCRIPTION OF THE DRAWINGS

Further characteristics and advantages of the hermetic sealing assembly according to the present invention will become apparent from the following detailed description of an embodiment thereof, illustrated only by way of non-limitative example in the accompanying drawings, wherein.

DESCRIPTION OF THE PREFERRED EMBODIMENTS

Figure 1:
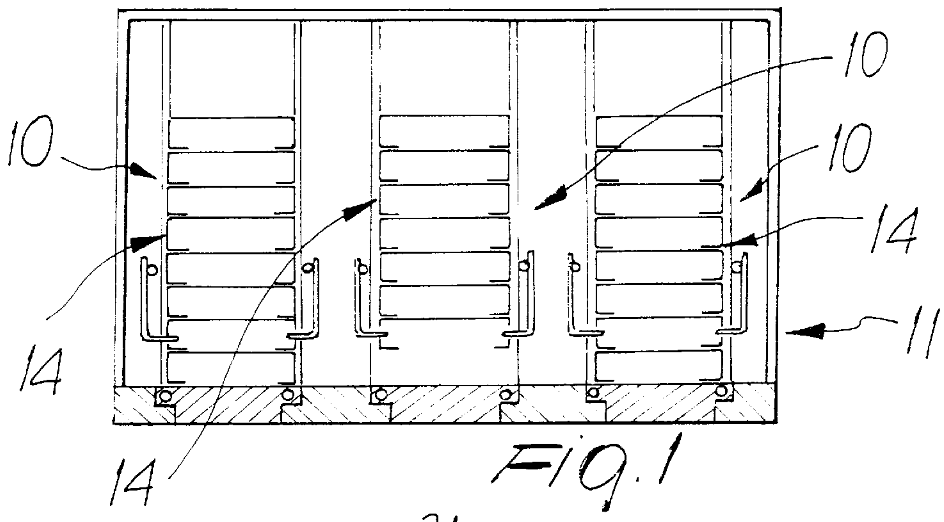
FIG. 1 is a view of a plurality of identical sealing assemblies according to the invention, applied to a food vending machine.
Figure 2:
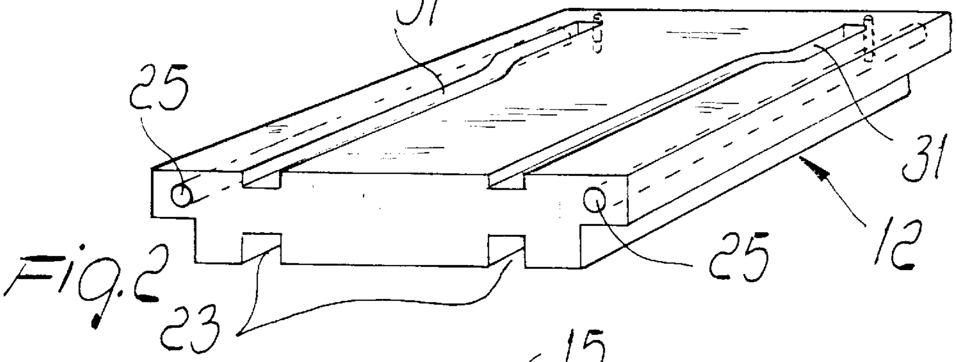
FIG. 2 is a perspective view of a detail of one of the assemblies of FIG. 1.
Figure 3:
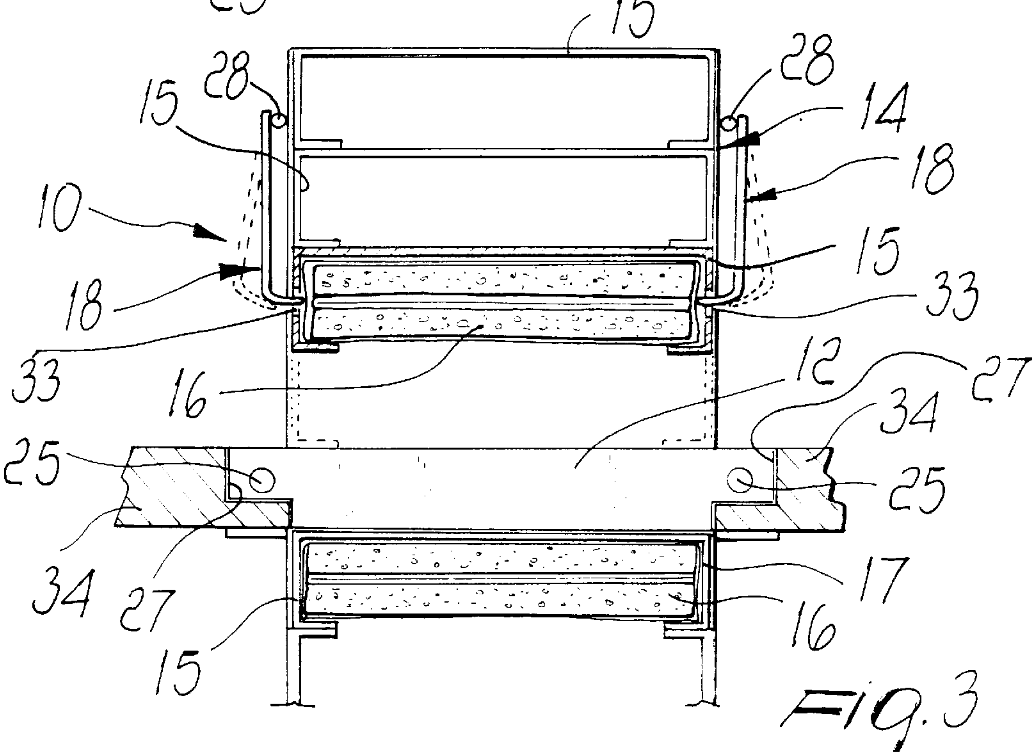
FIG. 3 is a sectional view of one of the assemblies of FIG. 1.
Figure 4:
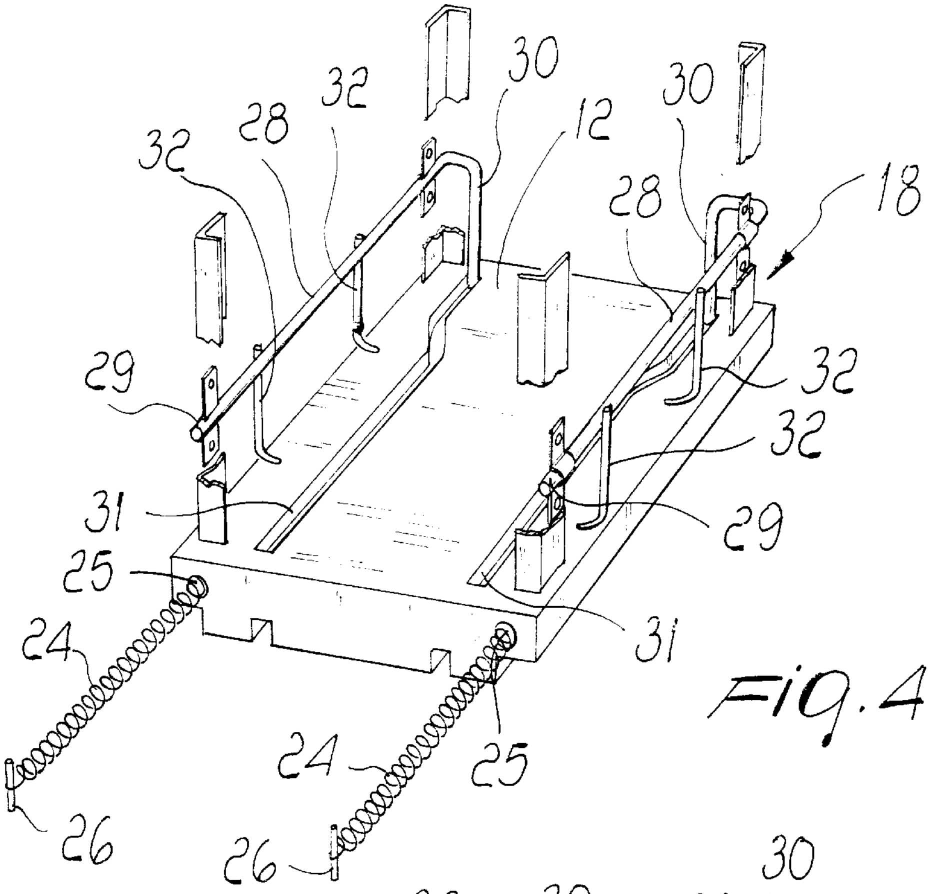
FIG. 4 is a perspective exploded view of the assembly of FIG. 2.
Figure 5:
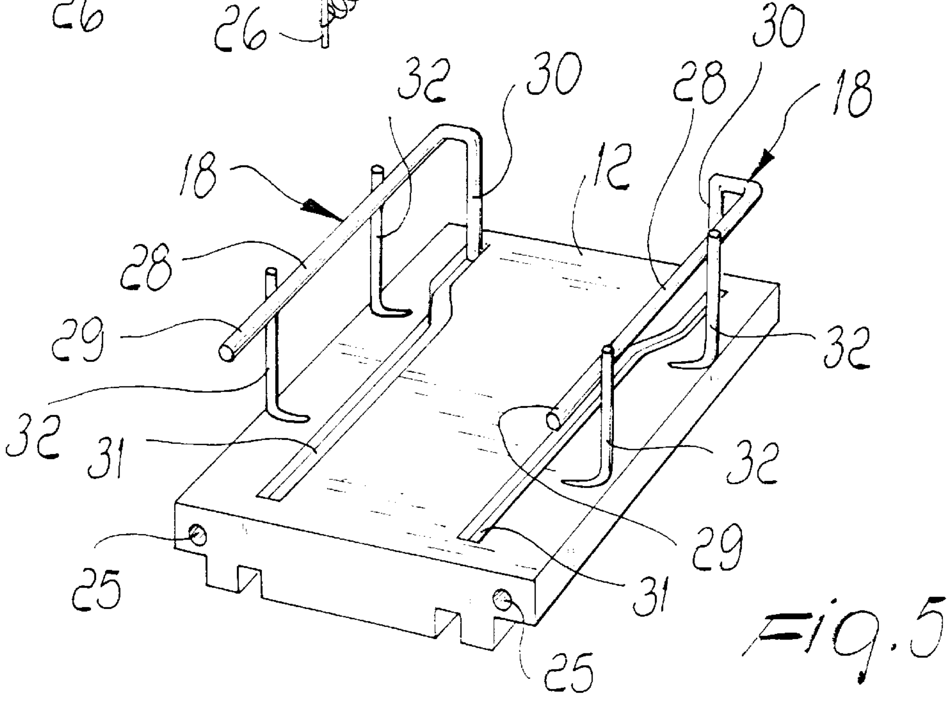
FIG. 5 is a perspective view of the assembly of FIG. 2.
Figure 6:
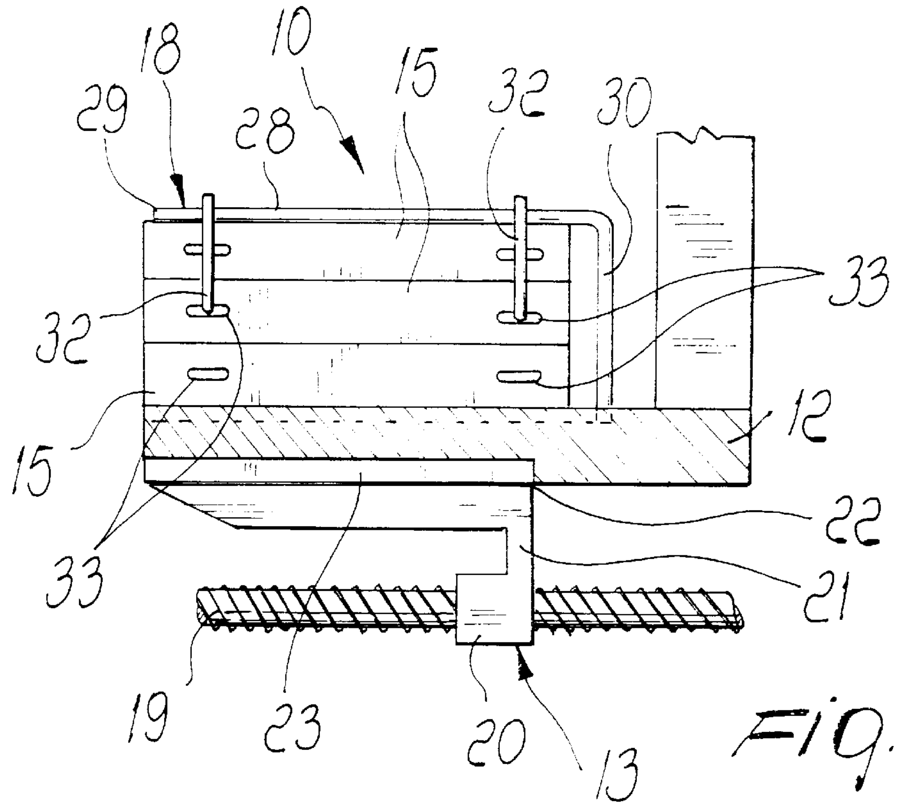
FIGS. 6 and 7 are sectional views of the assembly of FIG. 4 in two operating steps.
Figure 7:
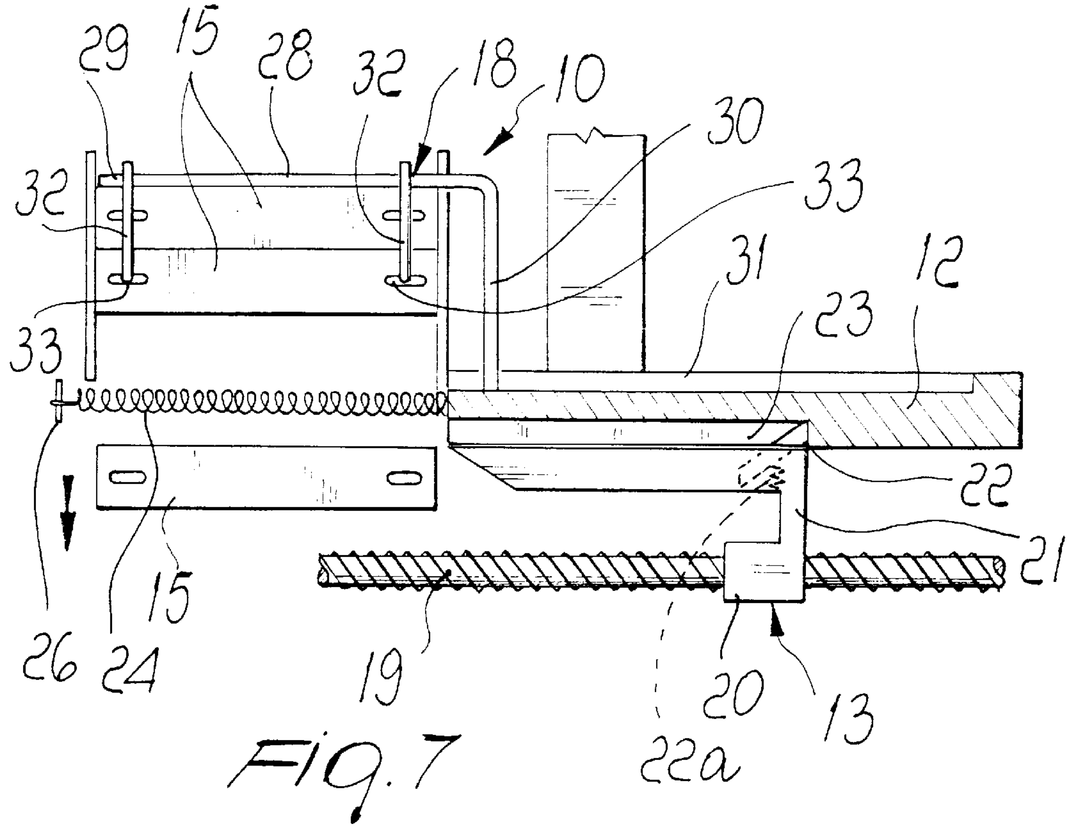

With particular reference to FIGS. 1 to 7, a hermetic sealing assembly for refrigerators in machines for vending prepackaged foodstuffs, such as toasts, small pizzas and the like, according to the invention, is generally designated by the reference numeral 10.

In particular, the assembly 10 is accommodated, together with two other similar assemblies, in a refrigeration chamber 11 of a food vending machine, which is not illustrated as a whole and is of a per se known type.

The sealing assembly 10 comprises a sliding plate 12 which is moved in an axial and planar direction by actuator means which are generally designated by the reference numeral 13 and are described hereinafter.

In particular, the plate 12 is suitable to act as a sealing element for the refrigeration chamber 11 during food storage and as a removable support during vending for a corresponding stack 14 (three whereof are provided in the refrigeration chamber 11) of metallic containers 15 which contain the prepackaged foodstuffs 16 to be dispensed, in this case, to the cooking section.

The container 15 located in the lowermost position of the corresponding stack 14 rests on the sliding plate 12.

The container can instead fall freely by gravity into a collection seat for dispensing, designated by the reference numeral 17, when the plate 12 is removed by said axial actuation means.

The assembly 10 also comprises means, described in greater detail hereinafter, for temporarily supporting the containers 15 stacked on top of the lowermost one; said means are associated and synchronized with the sliding plate 12 and are generally designated by the reference numeral 18.

In particular, in this case the actuation means 13 are of the type with an axially arranged motorized screw.

More specifically, the actuation means 13 comprise a threaded shaft 19 which is arranged in the direction of motion and is engaged with a screw-and-nut coupling to a threaded sleeve 20 which is fixed to a bracket 21 provided with pins 22 which can retract (due to the presence of a lower compression spring 22*a*), are arranged above the bracket 21 and are anchored in suitable slots 23 formed below the plate 12.

In this case, the plate 12 is also provided with elastic return means constituted by at least two helical springs 24 which are arranged axially; each spring 24 is fixed, at one end, in a corresponding seat 25 formed axially in one of the two sides of the plate 12, while the other end is fixed by means of a pin 26 to the lower wall of the chamber 11.

In particular, the plate 12 can slide, at its longitudinal edges, on seats, designated by the reference numeral 27, which are formed by milling in the fixed base 33 inside the chamber 11.

The above-mentioned temporary supporting means, generally designated by the reference numeral 18, comprise in this case, for each one of the containers 15, an L-shaped rod-like element 28 in which one end 29 is supported, so that it can rotate about its own axis (horizontally), within the chamber 11, while the other end, designated by the reference numeral 30, is engaged in a cam-like fashion inside a corresponding guide 31 formed in the upper region of the sliding plate 12.

The guide 31 is shaped so as to close hook-like elements 32 which are fixed to the rod-like element 28, at right angles to the rotating horizontal axis, in corresponding lateral holes 33 formed in the containers 15.

In particular, the hook-like elements 32 close in step with the disengagement of the plate 12 from the support.

Viceversa, the hook-like elements 32 are moved to open when the plate 12 is returned to the supporting position.

In practice it has been observed that the present invention has achieved its intended aim and objects.

To be observed is the extreme simplicity wherewith the sealing assembly according to the invention transfers the containers from the refrigeration chamber to the outside environment and therefore directly to vending when cold, or to the cooking section before vending, without significant heat exchange between the outside and the inside of the refrigeration chamber.

In this manner, the problem of condensation and therefore the possibility of damaging the prepackaged foodstuffs have been fully eliminated.

Moreover, the entire system has been provided with extreme constructive simplicity and therefore with particularly low costs.

Another feature is the constructive solidity of the sealing assembly according to the invention, which has no particular maintenance requirements.

Attention is also drawn to the extreme application flexibility of the sealing assembly according to the invention and to the possibility to also apply it to vending machines which are already in production.

The present invention is susceptible of numerous modifications and variations, all of which are within the scope of the inventive concept; likewise, the constructive details may be replaced with other technically equivalent elements.

The materials and the dimensions may be any according to requirements.

What is claimed is:

1. A hermetic sealing assembly for refrigerators in machines for vending prepackaged foodstuffs, such as sandwiches, toasts, small pizzas or the like, comprising a sliding plate which is moved in an axial and planar direction by actuation means and is suitable to act as a sealing element for a refrigeration chamber during food storage and as a removable support, during vending, for a stack of metallic containers which contain the prepackaged food to be dispensed, the lowermost container of said stack resting on said plate and being instead able to fall freely by gravity into a collection seat for vending when said plate is removed by said actuation means; supporting means for temporarily supporting the containers stacked on top of the lowermost container being provided and being associated and synchronized with said axial movement.

2. An assembly according to claim 1, wherein said actuation means are of the type with an axially arranged motorized screw.

3. An assembly according to claim 2, wherein said actuation means comprise a threaded shaft which is engaged with a screw-and-nut coupling to a threaded sleeve which is fixed to a bracket and is provided with pins which are anchored in suitable slots formed in a downward region of said plate.

4. An assembly according to claim 2, wherein said actuation means comprise elastic return means.

5. An assembly according to claim 4, wherein said elastic return means comprise at least two helical springs which are arranged axially, each spring having an end which is fixed to a corresponding seat formed axially in one of the sides of said plate, the other end being fixed to the inside wall of said chamber.

6. An assembly according to claim 1, wherein said plate can slide at its longitudinal edges in corresponding seats of a base inside the refrigeration chamber that accommodates it.

7. An assembly according to claim 6, wherein said base is constituted by a plate and said seats are formed by machining.

8. An assembly according to claim 1, wherein said supporting means comprise, for each side of the containers, an L-shaped rod-like element in which one end is supported, so that it can rotate about its own axis, within said refrigeration chamber, while the other end is engaged in a cam-like fashion within a corresponding guide formed in an upper region of said plate and suitable to close hook-like elements within corresponding lateral holes formed in said containers, when said plate is moved for disengagement, and viceversa during opening, said hook-like elements being fixed at a substantially horizontal portion of a corresponding segment of a rod-like element and lying at right angles thereto.

* * * * *